US009760785B2

(12) United States Patent
Kursun et al.

(10) Patent No.: US 9,760,785 B2
(45) Date of Patent: Sep. 12, 2017

(54) SYSTEMS AND METHODS FOR HIGH FIDELITY MULTI-MODAL OUT-OF-BAND BIOMETRIC AUTHENTICATION

(71) Applicant: JPMorgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 268 days.

(21) Appl. No.: 13/908,618

(22) Filed: Jun. 3, 2013

(65) Prior Publication Data

US 2014/0333413 A1 Nov. 13, 2014

Related U.S. Application Data

(60) Provisional application No. 61/820,917, filed on May 8, 2013, provisional application No. 61/823,669, filed on May 15, 2013.

(51) Int. Cl.
*G06K 9/00* (2006.01)

(52) U.S. Cl.
CPC ................................ *G06K 9/00892* (2013.01)

(58) Field of Classification Search
CPC .......... G06F 21/32; G06F 21/34; G06F 21/35; G06F 21/88; G06Q 20/40145;
(Continued)

(56) References Cited

U.S. PATENT DOCUMENTS 5,072,294 A 12/1991 Engle
5,648,648 A 7/1997 Chou
(Continued)

FOREIGN PATENT DOCUMENTS

EP 2560123 2/2013
WO WO 2008/055181 5/2008
(Continued)

OTHER PUBLICATIONS

Notification of Transmittal of the International Search Report and the Written Opinion of the International Searching Authority, or the Declaration, Dec. 9, 2014.
(Continued)

*Primary Examiner* — James Yang
(74) *Attorney, Agent, or Firm* — Hunton & Williams LLP

(57) ABSTRACT

Systems and methods for high fidelity multi-modal out-of-band biometric authentication are disclosed. According to one embodiment, a method for multi-mode biometric authentication may include (1) receiving, at a computer application executed by an electronic device, a first input from a first input device on the electronic device; (2) receiving, at the computer application, a second data from a second input device on the electronic device; (3) receiving, at the computer application, a third input from a third input device on the electronic device; and (4) communicating, by the computer application and to a server, the first input, the second input, and the third input. The first input, second input and third input may be received within a predetermined time period, such as five seconds.

35 Claims, 14 Drawing Sheets

(58) Field of Classification Search
CPC ...... G06Q 20/341; G06Q 20/40; G06Q 20/32; G06Q 20/00; G07C 9/00103; G07C 2009/00095; G07C 9/00158
See application file for complete search history.

(56) References Cited

U.S. PATENT DOCUMENTS

| | | | | |
|---|---|---|---|---|
| 5,679,940 | A | 10/1997 | Templeton et al. | |
| 6,532,459 | B1 | 3/2003 | Berson | |
| 6,697,942 | B1 | 2/2004 | L'Heureux et al. | |
| 7,174,323 | B1 * | 2/2007 | Schultz | G06Q 20/3674 704/E17.009 |
| 7,330,570 | B2 | 2/2008 | Sogo | |
| 7,360,239 | B2 | 4/2008 | Mandalia et al. | |
| 7,454,470 | B1 | 11/2008 | Isaacs | |
| 8,065,175 | B1 | 11/2011 | Lewis | |
| 8,191,126 | B2 | 5/2012 | Raghavan | |
| 8,606,611 | B1 | 12/2013 | Fedorov | |
| 8,724,910 | B1 | 5/2014 | Pillai | |
| 8,892,461 | B2 | 11/2014 | Lau et al. | |
| 9,280,715 | B2 | 3/2016 | Stephanson | |
| 2001/0036300 | A1 | 11/2001 | Xia | |
| 2002/0140542 | A1 | 10/2002 | Prokoski | |
| 2002/0174344 | A1 | 11/2002 | Ting | |
| 2002/0180586 | A1 | 12/2002 | Kitson et al. | |
| 2003/0031348 | A1 | 2/2003 | Kuepper et al. | |
| 2003/0046228 | A1 | 3/2003 | Berney | |
| 2003/0210808 | A1 | 11/2003 | Chen | |
| 2004/0098481 | A1 * | 5/2004 | Gunji | G06F 21/32 709/225 |
| 2004/0228504 | A1 | 11/2004 | Chang | |
| 2005/0138391 | A1 | 6/2005 | Mandalia et al. | |
| 2005/0144560 | A1 | 6/2005 | Gruen | |
| 2006/0010217 | A1 | 1/2006 | Sood | |
| 2006/0095369 | A1 * | 5/2006 | Hofi | G06Q 20/10 705/39 |
| 2006/0227997 | A1 | 10/2006 | Au et al. | |
| 2006/0248344 | A1 | 11/2006 | Yang | |
| 2006/0259778 | A1 | 11/2006 | Gudorf | |
| 2007/0283142 | A1 | 12/2007 | Milstein et al. | |
| 2008/0077660 | A1 | 3/2008 | Tomida | |
| 2008/0126951 | A1 | 5/2008 | Sood | |
| 2008/0253622 | A1 | 10/2008 | Tosa et al. | |
| 2009/0182822 | A1 | 7/2009 | O'Sullivan | |
| 2009/0222913 | A1 | 9/2009 | Fujii | |
| 2009/0252383 | A1 | 10/2009 | Adam et al. | |
| 2009/0265106 | A1 | 10/2009 | Bearman | |
| 2010/0030798 | A1 | 2/2010 | Kumar et al. | |
| 2010/0067745 | A1 | 3/2010 | Kovtun et al. | |
| 2010/0169958 | A1 | 7/2010 | Werner et al. | |
| 2010/0251359 | A1 * | 9/2010 | Shirai | G06F 21/31 726/19 |
| 2010/0287382 | A1 | 11/2010 | Gyorffy et al. | |
| 2011/0072510 | A1 | 3/2011 | Cheswick | |
| 2011/0178962 | A1 | 7/2011 | Sood | |
| 2011/0208716 | A1 | 8/2011 | Liu et al. | |
| 2012/0023574 | A1 | 1/2012 | Osborn et al. | |
| 2012/0068820 | A1 | 3/2012 | Millicone | |
| 2012/0151377 | A1 | 6/2012 | Schultz et al. | |
| 2012/0157042 | A1 | 6/2012 | McCanna | |
| 2012/0158798 | A1 | 6/2012 | Patil | |
| 2012/0167199 | A1 | 6/2012 | Riddiford | |
| 2012/0169461 | A1 * | 7/2012 | Dubois, Jr. | G07C 9/00571 340/5.61 |
| 2012/0204035 | A1 | 8/2012 | Camenisch et al. | |
| 2012/0291120 | A1 | 11/2012 | Griffin | |
| 2012/0319817 | A1 * | 12/2012 | Abe | G06K 9/036 340/5.82 |
| 2013/0055362 | A1 * | 2/2013 | Rathbun | H04L 63/18 726/5 |
| 2013/0117059 | A1 | 5/2013 | Norton et al. | |
| 2013/0268775 | A1 | 10/2013 | Hawkins | |
| 2013/0340061 | A1 | 12/2013 | Tsukamoto | |
| 2013/0346067 | A1 | 12/2013 | Bhatt | |
| 2014/0002238 | A1 | 1/2014 | Taveau | |
| 2014/0007185 | A1 * | 1/2014 | Han | H04L 63/0861 726/1 |
| 2014/0096196 | A1 | 4/2014 | O'Connor | |
| 2014/0137221 | A1 | 5/2014 | Dominic et al. | |
| 2014/0181956 | A1 | 6/2014 | Ahn et al. | |
| 2014/0270404 | A1 | 9/2014 | Hanna | |
| 2014/0347479 | A1 | 11/2014 | Givon | |
| 2015/0200899 | A1 | 7/2015 | Sanketi | |

FOREIGN PATENT DOCUMENTS

| | | |
|---|---|---|
| WO | WO 2009/067738 | 6/2009 |
| WO | WO 2012/164385 | 12/2012 |
| WO | WO 2012173655 | 12/2012 |

OTHER PUBLICATIONS

International Search Report, Dec. 9, 2014.

Written Opinion of the International Searching Authority, Dec. 9, 2014.

Notification of Transmittal of the International Search Report and the Written Opinion of the International Searching Authority, or the Declaration (PCT/US2014/048822), Nov. 24, 2014.

International Search Report (PCT/US2014/048822), Nov. 24, 2014.

Written Opinion of the International Searching Authority (PCT/US2014/048822), Nov. 24, 2014.

European Patent Office Communication and Supplementary European Search Report, European Patent Application No. 14794941.6, Nov. 18, 2016, pp. 1-8.

* cited by examiner

SYSTEMS AND METHODS FOR HIGH FIDELITY MULTI-MODAL OUT-OF-BAND BIOMETRIC AUTHENTICATION

RELATED APPLICATIONS

This patent application is related to U.S. Provisional Patent Application Ser. No. 61/820,917, filed May 8, 2013, and U.S. Provisional Patent Application Ser. No. 61/823,669, filed May 15, 2013, the disclosures of which are incorporated by reference in their entireties.

BACKGROUND OF THE INVENTION

1. Field of the Invention

The present invention generally relates to biometric authentication and, more particularly, to systems and methods for high fidelity multi-modal out-of-band biometric authentication.

2. Description of the Related Art

To access a company network or website, users generally enter a user name and password. A similar approach may be used when a user attempts to access an on-line account that the user may have with, for example, a financial institution, service/utility provider, etc.

SUMMARY OF THE INVENTION

Systems and methods for high fidelity multi-modal out-of-band biometric authentication are disclosed.

According to one embodiment, a method for multi-mode biometric authentication may include (1) receiving, at a computer application executed by an electronic device, a first input from a first input device on the electronic device; (2) receiving, at the computer application, a second data from a second input device on the electronic device; (3) receiving, at the computer application, a third input from a third input device on the electronic device; and (4) communicating, by the computer application and to a server, the first input, the second input, and the third input. The first input, second input and third input may be received within a predetermined time period, such as five seconds.

In one embodiment, the electronic device may be a mobile electronic device, and the computer application may be a mobile application. In one embodiment, the first input device may be a first camera, and the first input may be a machine-readable code, such as a QR code.

In one embodiment, the second input device may be a second camera, and the second input may be an image of at least a part of a user. The image of the user may include at least one of the user's eyes, irises, etc. In another embodiment, the image of the user may include the user's face.

In one embodiment, the third input device may be a microphone, and the third input may be a voice biometric. In another embodiment, the third input device may be touch-sensitive, and the third input may be touch-based biometric, such as a finger biometric.

In one embodiment, the third input may be a behavioral biometric.

In one embodiment, the third input may be a thermal biometric.

In one embodiment, the first input, the second input, and the third input may be received in response to a user attempting to access a website.

In another embodiment, the first input, the second input, and the third input may be received in response to a user attempting to conduct a transaction. In one embodiment, the transaction may have a value above a predetermined value. In another embodiment, transaction may have a risk level above a predetermined risk level.

In one embodiment, the first input, the second input, and the third input may be received in response to a user launching a second computer application.

In another embodiment, a method for multi-mode biometric authentication is disclosed. The method may include (1) receiving, at a computer application executed by an electronic device, an image of at least a portion of a user at a first camera on the electronic device; (2) displaying, on a touch screen of the electronic device, the image of at least a portion of the user; (3) receiving, at the electronic application, touch data on the image of at least a portion of the user from the touch sensitive portion of the touch screen; and (4) communicating, to a server, the image of at least a portion of the user and the touch data. The image of at least a portion of the user and the touch data may be received within a predetermined time period, such as five seconds.

In one embodiment, the touch data may be related to the image of at least a portion of the user.

In one embodiment, the image of at least a portion of the user may be displayed with a plurality of markers, and the touch data may include a pattern trace among at least two of the markers.

In another embodiment, the image of at least a portion of the user may be displayed with a plurality of highlighted areas, and the touch data may include a pattern trace among at least two of the highlighted areas.

In another embodiment, the image of at least a portion of the user may be displayed with a signature area, and the touch data may include a signature of the user.

In one embodiment, the image of at least a portion of the user and the touch data may be received in response to a user attempting to access a website.

In another embodiment, the image of at least a portion of the user and the touch data may be received in response to a user attempting to conduct a transaction. In one embodiment, the transaction may have a value above a predetermined value. In another embodiment, transaction may have a risk level above a predetermined risk level.

In one embodiment, the image of at least a portion of the user and the touch data may be received in response to a user launching a second computer application.

In one embodiment, the method may further include receiving, at the computer application, a biometric from the user at an input device on the electronic device, and the biometric is communicated to the server with the image of at least a portion of the user and the touch data, and the image of at least a portion of the user, the touch data, and the biometric are received within the predetermined time period.

According to another embodiment, a method for biometric authentication is disclosed. The method may include (1) capturing, at an electronic device, an image of an iris of a user; (2) comparing, using at least one computer processor, biometrics data from the image of the iris to stored iris biometrics data for the user; (3) verifying that the image of the iris is a live image; (4) capturing, at the electronic device, a side image of the iris; (5) verifying, using the at least one computer processor, a transparency of a cornea in the side image of the iris; and (6) authenticating the user.

In one embodiment, the image of the iris may be a video of the iris.

In one embodiment, wherein the step of capturing an image of an iris of a user may include: capturing a first image of a first iris of the user; and capturing a second image of a second iris of the user. The first image and the second image may be the same image. In another embodiment, the first image and the second image may be a video.

In one embodiment, the step of verifying that the image of the at least one iris of the user is a live image may include: capturing a first image of at least one pupil of the user at a first lighting level; capturing a second image of the at least one pupil of the user at a second lighting level; determining, using the at least one computer processor, a change in a size of the at least one pupil in the first image and the second image; determining a change in lighting level in the first lighting level and the second lighting level; and determining if the change in the size of the at least one pupil is proportional to the change in lighting level.

In one embodiment, the change in lighting level may be caused changed by illuminating a light on the mobile device.

In another embodiment, the change in lighting level may be caused by changing a brightness of the touch screen on the mobile device.

In one embodiment, the step of verifying that the image of the at least one iris of the user is a live image may include: instructing the user to perform an eye movement; capturing, at the electronic device, at least one second image of the at least one iris; and verifying that a position of the iris in the first image and the second image are different. The instruction to perform an eye movement may be an instruction for the user to look in a direction. In another embodiment, the instruction may be for the user to blink.

The method may further include detecting, using the at least one computer processor, if the user is wearing color contact lenses.

In one embodiment, the step of verifying, using the at least one computer processor, a transparency of a cornea in the side image of the iris may include comparing, using the at least one computer processor, biometrics data from the image of the cornea to stored cornea biometrics data for the user.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
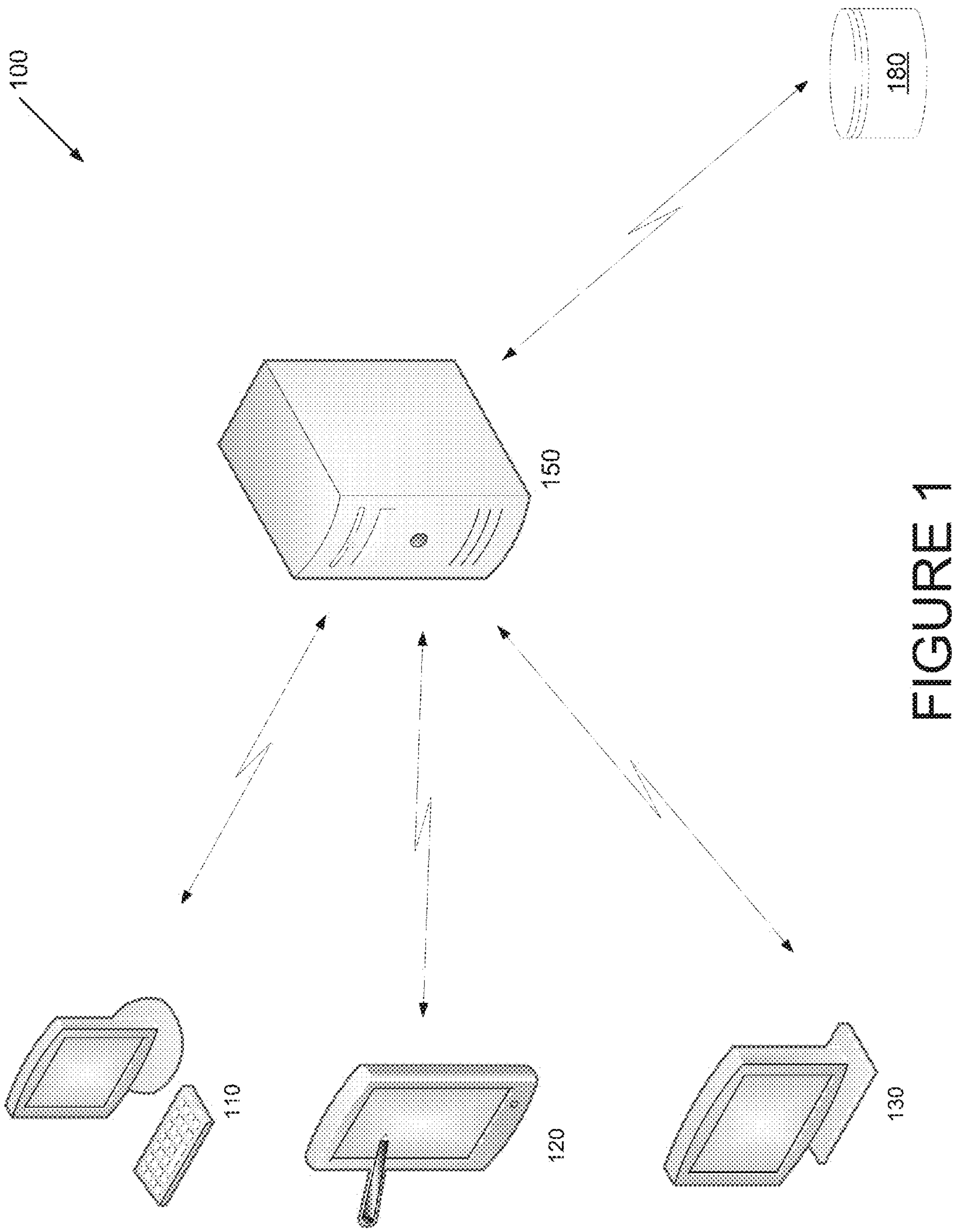
FIG. 1 is a block diagram of a system for high fidelity multi-modal out-of-band biometric authentication according to one embodiment.

Several embodiments of the present invention and their advantages may be understood by referring to FIGS. 1-13, wherein like reference numerals refer to like elements.

Embodiments of the invention relate to a biometrics authentication process. This authentication may be used, for example, if a user seeks to access a network, to sign-in to an account, to authorize a certain transaction (e.g., a high risk/value transaction), to authorize access to a computer application, such as mobile application, a computer program, etc. In one embodiment, a mobile device may be used to authenticate a user's access to an account on a desktop computer. For example, a code, such as a QR code, may be displayed on the screen of the desktop computer on which the user is seeking to access an account, conduct a transaction, etc. Using the user's registered mobile device, the user may "simultaneously" (i.e., within a predetermined short time period, such as 5 seconds) scan the QR code with the front-facing camera, take an image of the user's face, facial features (e.g., eyes, irises, etc.) with the rear-facing camera, and speak a verbal password for the microphone. The server may authenticate the user based on all three entries (e.g., code, facial image, voice biometric, etc.).

Other biometrics, such as iris recognition (using the rear-facing camera), finger print, retinal scan, DNA sample, palm print, hand geometry, odor/scent, gait, etc. may be used. In one embodiment, infrared cameras may be used to capture a user's thermal signature.

To authenticate a user using a mobile device in the absence of a desktop, a QR code may not be used. Facial recognition and a biometric, however, may still be entered "simultaneously." Other inputs, including gestures, touch patterns, etc. may be used as necessary and/or desired.

During the voice registration process, the server may record phrases, words, etc. These phrases may be used as recorded, or the words contained therein may be interchangeable. The system may account for variations in pronunciation based on the location of each word in the phrase.

Behavioral characteristics, such as the angle at which the user holds the mobile device, the distance from the user's face when taking an image, etc. may also be captured and used for authentication.

The server may also provide time stamping/geostamping to the phrase, such as having the user speak the current date/time, the user's location, an answer to a prompt provided by the mobile device, etc. The GPS location and server date/time may also be appended to the authorization request. This may not only be useful in the authorization process, but may also be useful in reducing fraudulent false claims.

Several biometrics may be combined into a single composite or integrated biometric. For example, a user may register several full biometrics (e.g., voice, finger print, signature, etc.) that may be combined into an integrated biometric, or the user may register an integrated biometric that is generated at the mobile device.

In another embodiment, an integrated biometric may not include a full biometric, but rather portions of several biometrics. When the user provides the biometric samples, only an integrate biometric may be transmitted for authentication. This may be used if limited bandwidth is available, or if the transmission of a full biometric is prohibited.

In certain environments, such as noisy environments, it may be difficult to accurately capture a voice sample for authentication. Alternatively, a user may not wish to provide a voice entry in public, or additional verification for a specific transaction, etc. Thus, other authentication methods, such as tracing a pattern over, for example, the image (live or static) of a user's face, highlighted portions of the user's face, using gestures such as blinking, touching lips, eyes, ears, etc. may be used. The user may also be presented with a signature space, the location and orientation of which may vary to prevent machine-generated signatures. The speed, pressure, etc. applied during the signature process may be captured as well to assist in authentication.

A user's profile may also identify delegates who may be able to authenticate the user if the user is unable to authenticate him or herself (e.g., the user has laryngitis or other ailment) or a biometrics match falls below a predetermined threshold. The delegate may also be required to be a registered user, and may have to authenticate him or herself before authenticating the user.

Referring to FIG. 1, a block diagram of a system for high fidelity multi-modal out-of-band biometric authentication according to one embodiment is provided. System 100 includes workstation 110, which may be any suitable computer, including for example, desktop computers, laptop computers, notebook computers, etc.

System 100 may further include mobile electronic device 120. In one embodiment, mobile electronic device 120 may be a smartphone (e.g., Apple iPhone, Samsung Galaxy, etc.), a tablet computer (e.g., Apple iPad, Samsung Galaxy, Amazon Kindle, Barnes & Nobel Nook Tablet, etc.), Google Glass, Smart E-watch/Bracelet, etc. In one embodiment, mobile electronic device 120 may include at least one camera for capturing a machine readable code (e.g., a bar code, QR code, etc.), a microphone, and a speaker. In one embodiment, mobile device 120 may include a front-facing camera and a rear-facing camera.

In one embodiment, system 100 may include screen 130 that may be part of an access control system for a secure area. Screen 130 may be part of an access control system that may be provided at the exterior of a secure area.

System 100 may include server 150. In one embodiment, server 150 may host an application that may be used to authenticate a user. Although only one server is depicted in FIG. 1, more than one server may be provided. For example, a server for biometric authentication may be provided, a server for facial recognition may be provided, etc.

Database 180 may receive, store and/or maintain user information, account information, biometric information, etc.

Workstation 110, mobile electronic device 120 and screen 130 may communicate with server 150 over any suitable network, including the Internet, a local area network, wide area network, virtual private network, etc. In one embodiment, workstation 110 and mobile electronic device 120 and/or screen 130 may communicate with each other using any suitable communication protocol, including WiFi, Bluetooth, Near Field Communication, etc.

Figure 2:
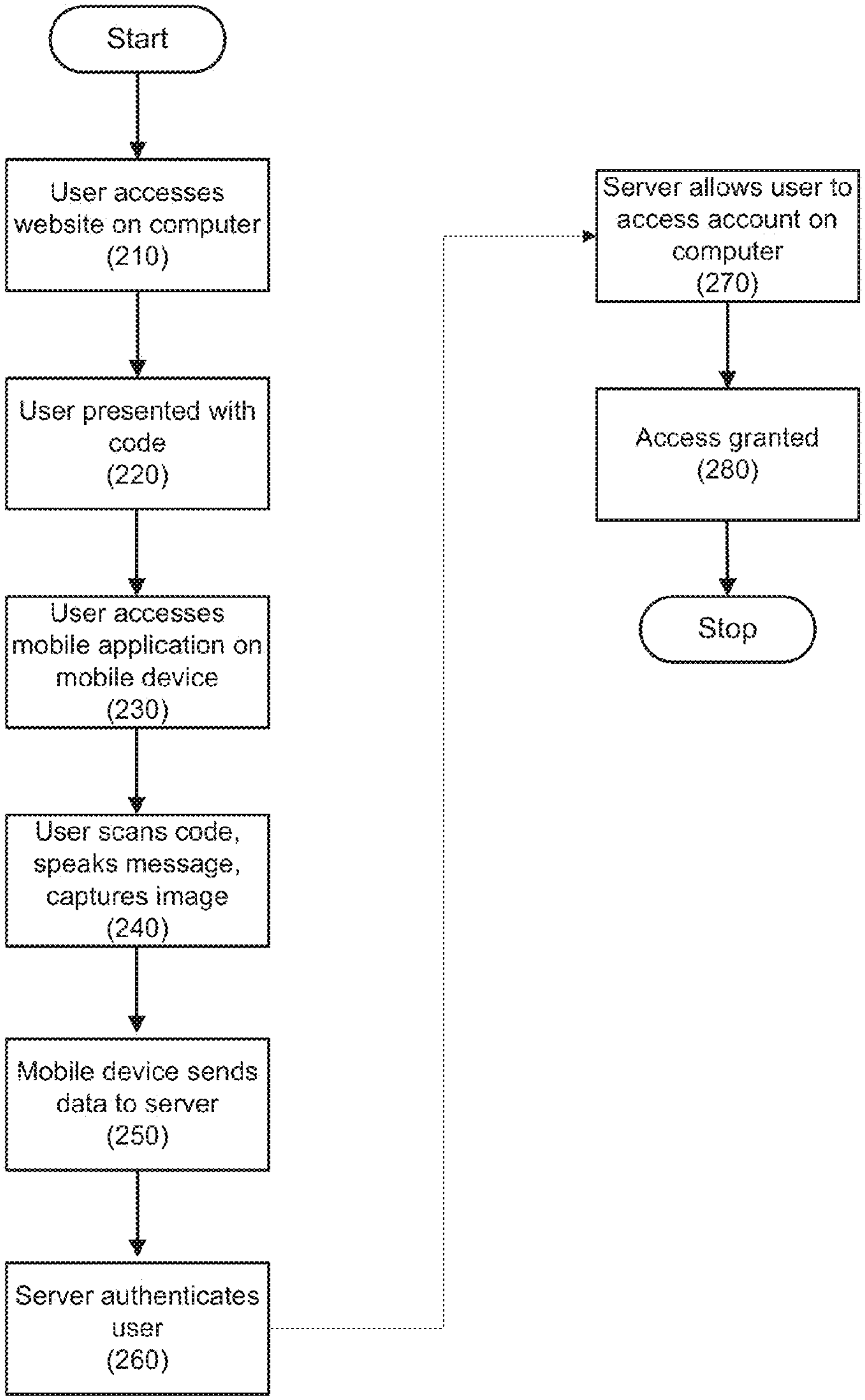
FIG. 2 depicts a method for high fidelity multi-modal out-of-band biometric authentication according to one embodiment.

Referring to FIG. 2, a method for high fidelity multi-modal out-of-band biometric authentication according to one embodiment is provided.

In step 210, the user may access a website. In one embodiment, the website may require the user to provide credentials before the user is granted access to the site.

In one embodiment, the user may access the website on a workstation, on a mobile device, on an access panel outside a secure area, etc. For convenience, embodiments will be described in the context of a "workstation," It should be appreciated, however, that this term encompasses desktop computers, notebook computers, laptop computers, access panels, etc.

The website may be any website that maintains an account for the user. For example, the website may be a company website that may require the user to log in. In another embodiment, the website may be for a financial institution with which the user has an account. In another embodiment, the website may be for a medical facility. The website may be used for any suitable business or organization as necessary and/or required.

In another embodiment, the website may be part of an organization's intranet or local area network.

In still another embodiment, the user may launch an authentication computer program or application, such as a mobile application on a mobile device.

For simplicity, the terms "computer program" and "mobile application" will be used interchangeably.

In step 220, the workstation may present the user with a code on the website. In one embodiment, the code may include a unique identifier that may link a browser session, access session, etc. to the user.

In one embodiment, the code may be a machine-readable code, such as a QR code, a bar code, an image, characters, etc. Any suitable code may be used as necessary and/or desired.

In one embodiment, the code may be provided on other devices that have access to the network, including other mobile devices, computers, tablets, televisions, monitors, etc. In one embodiment, the device that provides the code may be a "trusted" device (e.g., a registered device).

In one embodiment, the code may be provided as a RFID code, an audible code, an infrared code, etc.

In one embodiment, the code may be provided instead of a "traditional" log-in screen (e.g., enter a user name and password). In another embodiment, the code may be provided in addition to the traditional log-in information.

In another embodiment, the user may be presented with the code under certain circumstances. For example, the user may periodically be required to authenticate using the code. This may be done weekly, monthly, bi-weekly, whenever the user changes passwords, etc.

In another embodiment, the user may be required to provide authentication when he or she attempts to conduct a transaction with a risk level or value level above a predetermined threshold. For example, if the user attempts to transfer $5,000 from his or her account, the user may be required to provide additional authentication. As another example, if the user attempts to access an area of the website that requires additional security, the user may be required to provide additional authentication.

In one embodiment, the workstation may also provide data to the server. For example, the workstation may provide the session ID, user ID, and a biometrics to the server.

In step 230, if the use has not already accessed a computer program or mobile application, the user may access a mobile application on a mobile device. In one embodiment, the mobile application may provide an interface to receive the code and, for example, receive at least one image of the user and receive a biometric from the user.

In one embodiment, the user may be required to register the mobile device with the server before the mobile application may be used. In another embodiment, the mobile application may be accessed when the code is received. In still another embodiment, the mobile application may be a mobile website accessed on the mobile device.

In another embodiment, the server may push an invitation by, for example, email, text, etc. to a registered mobile device. The invitation may include a link for the user to access an on-line authentication website, a link to download a mobile application, etc.

In step 240, the user may provide the required data to the mobile device. In one embodiment, the user may first input the code, and then will have a predetermined amount of time to provide at least one additional data entry. For example, the user may have 5 seconds to take at least one image of the user's face, and to speak a letter, word, phrase, number, etc. for the mobile device to record.

In one embodiment, three data inputs may be required. The first data input may be the code, the second input may be an image of at least a portion of the user, and the third input may be a biometric of the user.

In one embodiment, the three inputs may be received using three different input devices on the mobile device. For example, the user may use the front-facing camera to scan the code, the rear-facing camera to take at least one image of the user while the microphone receives the voice data from the user. In another embodiment, a touch screen on the mobile device may be used to receive a touch-based biometric (e.g., a fingerprint) from the user. In still another embodiment, gyroscopes and other devices on the mobile device may be used to detect an angle of the mobile device when taking an image of the user, etc.

In one embodiment, after receiving the code, the mobile device may decode the code to access the unique identifier or other information that may be encoded in the code.

In one embodiment, if a voice biometric is captured, the mobile device may display the letter(s), number(s), word(s), phrase(s), etc. that the user is to speak. In one embodiment, an image may be provided, and the user may be prompted to speak the name of the object (e.g., a dog is displayed and the user says "dog.").

In one embodiment, the user may be requested to provide a variable response as part of the voice response, where "variable" means a response that differs from what has been trained or recorded. For example, the user may register certain words or phrases with the server. During authentication, however, the user may be asked to repeat words or phrases that differ from those that were registered. The server may analyze the entered voice and determine if the spoken voice matches the registered voice and expected/predicted behavior.

In one embodiment, the user may be prompted to speak a "secret" phrase or password/passcode. In one embodiment, the user may be requested to use the secret phrase in a sentence. For example, if the user's passcode is "fat cat," the user may say "I just saw a fat cat walk down the street." In another embodiment, the user may be prompted to give verbal commands (e.g., "I'd like to log in to my account") to the systems as a part of the voice authentication. This information may then be used to cross check if the actions are consistent with verbal commands. In addition such natural language provides improved user experience.

In one embodiment, multiple, interchangeable words, numbers, phrases, etc. may be provided. In another embodiment, multiple passphrases may be extracted using training data set and may be rotated. For example, five different passphrases may be rotated, and two custom passphrases may be created based on trained data. The word "voice" is in the trained set used in combination with others for other custom phrases. In one embodiment, a combination and/or fusion of the previously described modalities may be used to match the speed/user experience characteristics, security levels, environmental conditions through machine learning techniques.

In another embodiment, for words that are not trained, the system may apply predictive-based techniques. Thus, if the user says "My voice is my password" instead of "My voice is my passphrase," the system can determine whether the word "password" meets the user's speech characteristics.

In still another embodiment, additional information to be provided or may be selected by the server. For example, the server may request a time stamp (e.g., date/time), a geo-stamp (e.g., the mobile device's location), a corporate/function stamp, an answer to server prompted question, etc. For example, the user may be requested to state the date, user's location, name of the user's employer, temperature, weather, stock quote, etc. The required additional information may be selected randomly, thereby decreasing the likelihood of an imposter being able to successfully use a recording.

In one embodiment, if the user does not complete the entry within a predetermined time, the entry process may stop. In one embodiment, the user may be given a limited number of attempts (e.g., 2 attempts) to enter data before a new code is required, an alternate logon is provided, etc. In another embodiment, after a predetermined number of unsuccessful logon attempts, the account may be locked or access may be otherwise restricted.

In step 250, the mobile device may provide the data to the server for verification. In one embodiment, each input (e.g., code, image(s), voice sample, etc.) may be provided to the server separately. In another embodiment, two or more of the inputs may be combined as to form an integrated sample.

Additional data may also be captured and provided to the server. For example, behavioral biometrics, such as the position (e.g., angle, distance from the face, etc.) that the user holds the mobile device may be determined. In another embodiment, characteristics of the user's speech (e.g., number of words/minute, intonation, etc.) may be determined. The GPS location of the mobile device may be provided. The time that the user took to enter all data may also be provided. In one embodiment, this data may be compared against previously-collected data to identify anomalies, outliers, etc., that may indicate fraud. In one embodiment, this data may be stored and future accesses may be compared against this data.

In step 260, the server may review the received data and authenticate the user, or decline access to the user. In one embodiment, any biometrics authentication may be performed by a biometrics server.

In one embodiment, the server may check with organization policies to make sure that use of biometric authentication is approved for granting access, authorizing a transaction, that the user is authorized based on the user's role to authorize the transaction, etc.

In one embodiment, the code may be verified. In one embodiment, this may include verifying the data in the code, checking the time that it took from the code being provided to the user to the completion of the data entry, etc. In one embodiment, session data from the code may be validated and/or verified.

In one embodiment, the voice data may be reviewed to see if it is consistent with stored voice data. Examples of suitable commercially-available voice authentication software include VoiceVault Fusion by VoiceVault, VoiceVerified by CSID, VocalPassword™ and FreeSpeech™ from Nuance.

In one embodiment, variations in the voice sample may be considered based on the location of a word, number, letter, etc. in a phase that is spoken. For example, a user may speak a word differently depending on where the word is located in a phrase (e.g., beginning versus end), the word(s) that is spoken before/after, etc. Thus, if the word is not in the same spot as in the registration sample, some variation may be expected.

In step 270, if the user is authenticated, the server may allow the user to access the account, webpage, secure area, authorize the transaction, etc. In one embodiment, the server may allow the user to bypass the traditional user name and password log-in. In another embodiment, the user may still provide the traditional login information.

In one embodiment, the data received may be stored in a database if it was successful, if it was unsuccessful, or both. Successful data may be used to refine the voice biometric data, face recognition data, etc. for future access. It may also be used to identify repeated attempts to access an account, and may be provided to the authorities as necessary.

In step 280, access may be granted to the workstation, mobile device, etc. In one embodiment, an application on the workstation, mobile device, etc. may periodically poll the server for authorization.

Modifications may be made in situations where the entry of a voice biometric may not be appropriate, may be undesirable, or may not be possible. For example, a user may be in a noisy environment, in a meeting, etc. or may not feel comfortable speaking his or her passphrase out loud. Thus, image/video-based authentication, such as facial recognition, may be used.

In another embodiment, modifications may be made when additional authentication is required for certain transactions.

For example, in one embodiment, the user may make at least one gesture during the image capture. For example, the user may touch or move his or her eyes, ears, nose, lips, or any other location that has been preselected by the user. In another embodiment, the user may be instructed to touch a certain point of his or her face by the mobile device. In another embodiment, the user may blink, wink a predetermined number of times, in a predetermined pattern, etc., make facial gestures (e.g., smile, frown, etc.). This real-time instruction may be used to reduce the possibility of an imposter capturing an image of a picture of the user.

In another embodiment, the user may touch or indicate at least one element or area on the captured image. For example, after image capture, the image may be displayed to the user with regions on the face being highlighted or otherwise indicated. The regions may be color coded by the face recognition algorithm. The user may select at least one region, trace a trail among several regions, etc.

In another embodiment, markers (e.g., dots or a similar indicator) may be provided on the image of the user, and the user may be requested to trace a registered pattern among the markers. In one embodiment, the user may be requested to trace a pattern over a live image/video of himself or herself in real-time.

In another embodiment, the user may sign his or her name on the screen while the front-facing camera captures an image or video of the user signing. In another embodiment, the user may sign a space that may be randomly located on an image of the user's face.

In still another embodiment, behavioral profiles may be considered. For example, a detailed profile of user behavior including markers such as the distance from the mobile device to the user's face, the direction/angle of the mobile device, background images, light/noise levels, etc. may be considered. In one embodiment, if the anomaly exists (e.g., the mobile device is much further from the face than any other prior validation, etc.) the authentication attempt may be denied.

In another embodiment, a physical gesture password may be used. For example, after an image is captured, the user may be presented with the image of the face with markers superimposed thereon. In one embodiment, the markers may be based on characteristics of the user' face (e.g., structure, location of features, etc.). In one embodiment the user may selectively zoom in/out of regions using, for example, touch-screen features to create alternative images/distortions of the image that may be sent to the server for authentication.

In one embodiment, the markers may be specifically created by the face recognition algorithm. As such, the markers are biometrically significant/specific to the user. The position of the markers may change based on the captured image of the user on the device screen, which is affected by the distance between the device/face, angle/tilt of the face, direction of the camera, etc.

In another embodiment, the markers may be positioned in an array. Any suitable relationship between the markers and the face, including no relationship, may be used as necessary and/or desired.

In another embodiment, the user may touch at least one area of the user's face (e.g., ears, nose, chin, or biometric marker highlighted area, etc.), may blink a certain number of times, may make lip movements, expressions, etc., without blinking, etc.

Figure 3:
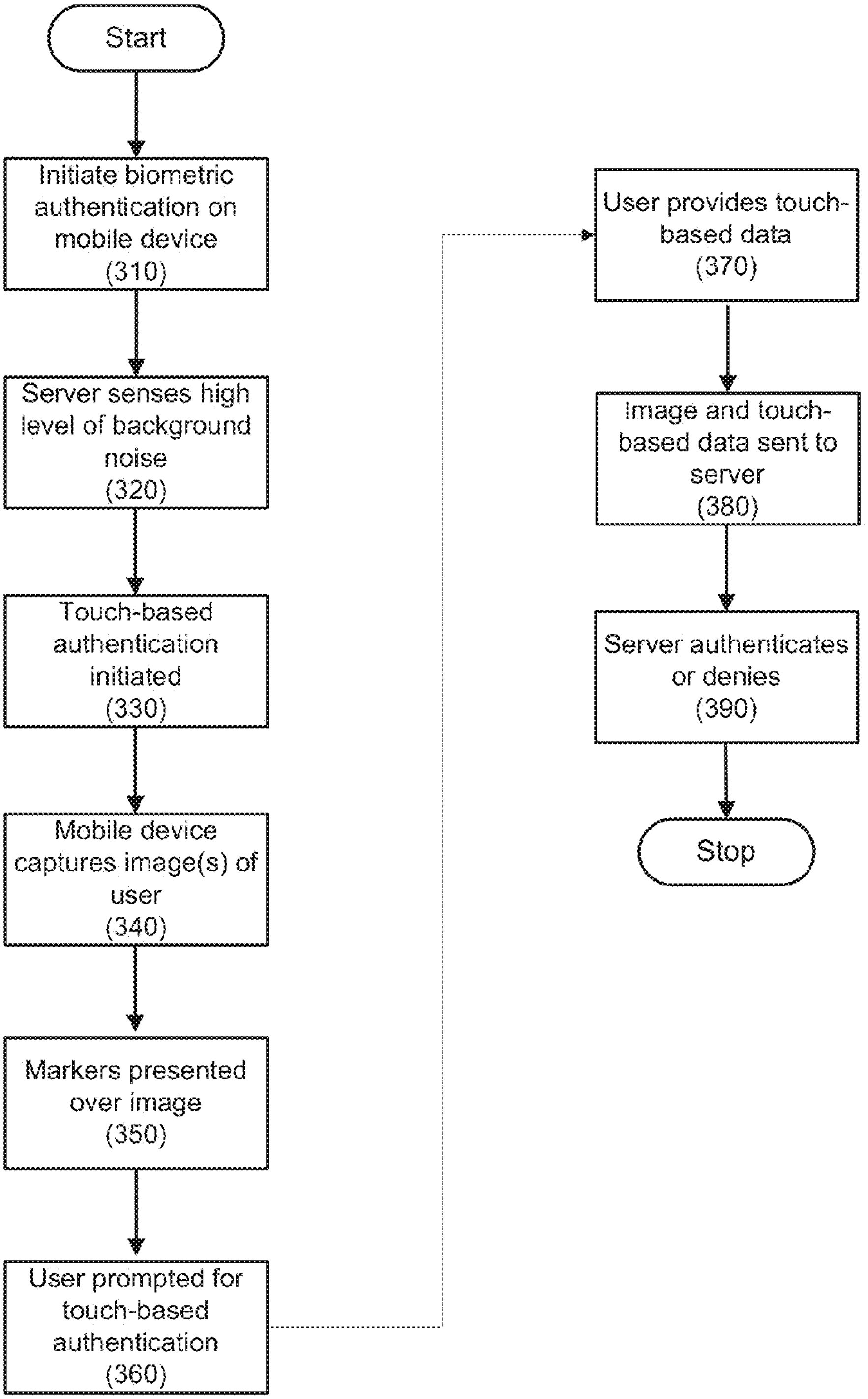
FIG. 3 depicts a method of authentication using touch and face recognition according to one embodiment.
Figure 4:
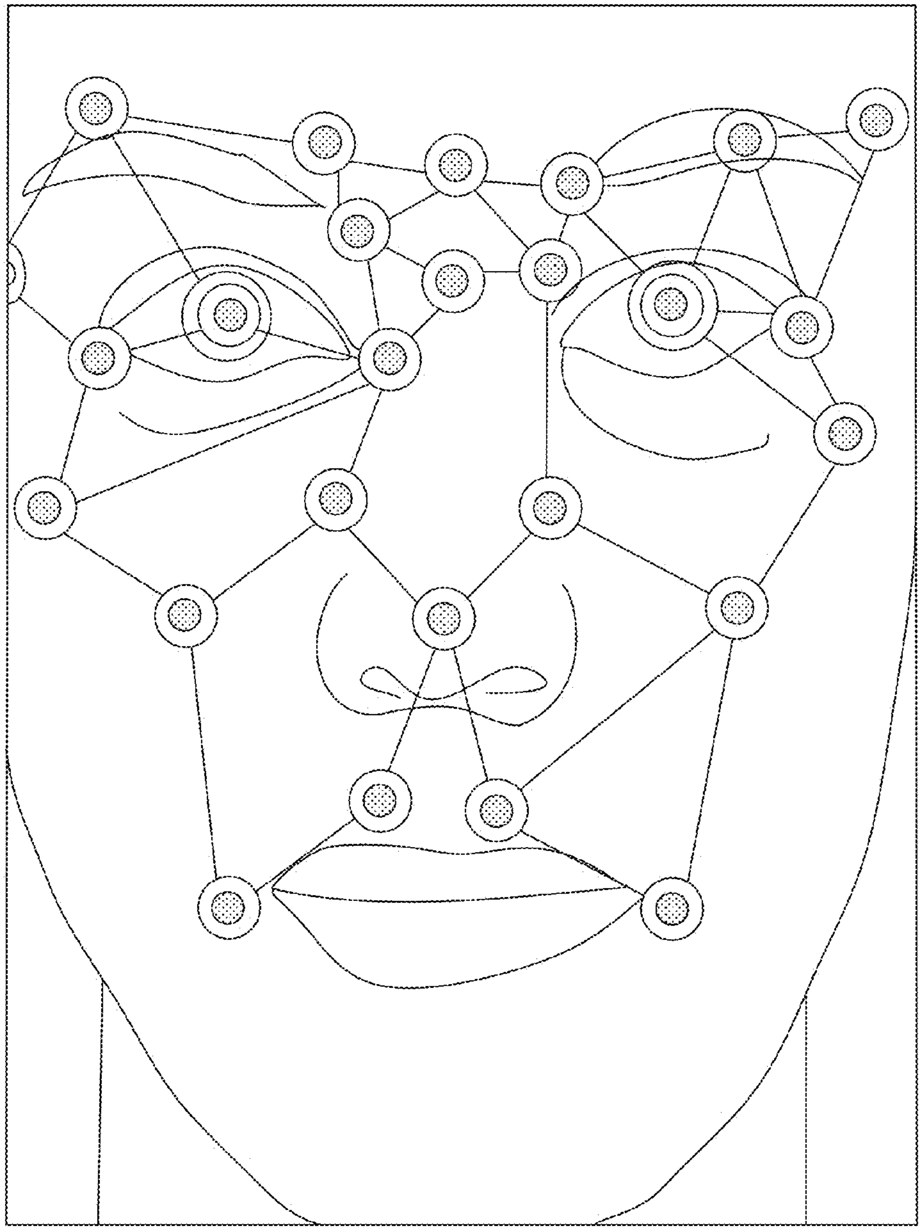
FIG. 4 depicts an example of a facial image with markers according to one embodiment.

Referring to FIG. 3, a method of authentication using touch and face recognition is provided. In step 310, the user may initiate biometric authentication on the user's mobile device.

In step 320, the server may sense a high level of background noise, thereby making voice-based authentication more difficult, undesirable, etc. In another embodiment, the user may determine that he or she does not wish to use voice-based authentication. In still another embodiment, the server may require additional authentication from the user.

In step 330, touch-based authentication may be initiated. In one embodiment, touch-based authentication may involve the user touching a captured image of himself or herself in at least one place, in a pattern, etc. In another embodiment, touch-based authentication may involve the user signing an area on the captured image. In still another embodiment, touch-based authentication may involve the user making a gesture by touching or otherwise indicating at least one area of the user's face during image capture.

In step 340, the mobile device may capture at least one image of the user. In one embodiment, the mobile device may capture a video of the user.

In one embodiment, a detailed profile may be acquired. For example, the device may capture background noise level/profile, lighting profile, GPS location of the mobile device, background image, etc. for anomaly detection.

In one embodiment, if gestures are used, the user may touch/indicate at least one area of the user's face during image capture.

In step 350, the mobile device may present an image of the user on the screen of the mobile device. In one embodiment, markers may be superimposed over the image of the face. In one embodiment, the location of the markers may be based on the features of the user's face. For example, markers may be provided at the corners of the user's eyes, center of the eyes, eye brows, corners of the mouth, nose, cheeks, etc. An example of such markers are provided in FIG. 4.

In another embodiment, the markers may be positioned independent of the facial features, and may present an array (e.g., a 4 by 4 array) or any random structure as necessary and/or desired.

In another embodiment, the user may be presented with an area to enter the user's signature on the image. In one embodiment, the size, location, and/or orientation of the signature area may vary so as to reduce the likelihood of imposters, robo-signatures, etc. In one embodiment, the speed of the signature, the pressure, and other signing characteristics may be captured and considered.

In one embodiment, the signature is required to fit a custom area marked by biometrics markers (i.e., aspect ratio, angle/tilt, size and other aspects of the signature have to be adjusted). This makes the process significantly difficult for imposters with previously captured signature profiles or cases where the imposter mimics signature manually.

In another embodiment, a signature space is not provided for the user on the image. Instead, the user pre-selects the markers that indicate the signature space, and enters his or her signature within that space. Thus, if the user does not know the markers, he or she will be unlikely to enter the signature in the proper area.

In step 360, the user may be prompted to provide the touch-based authentication. In one embodiment, if the user has multiple touch locations and/or patterns, the user may be reminded of the touch/pattern to enter.

In step 370, the user may provide the touch-based entry. For example, the user may touch at least one area of the face, at least one marker, etc. In another embodiment, the user may trace a pattern among the markers, areas, etc. Any suitable entry may be provided as necessary and/or desired.

Figure 5A:
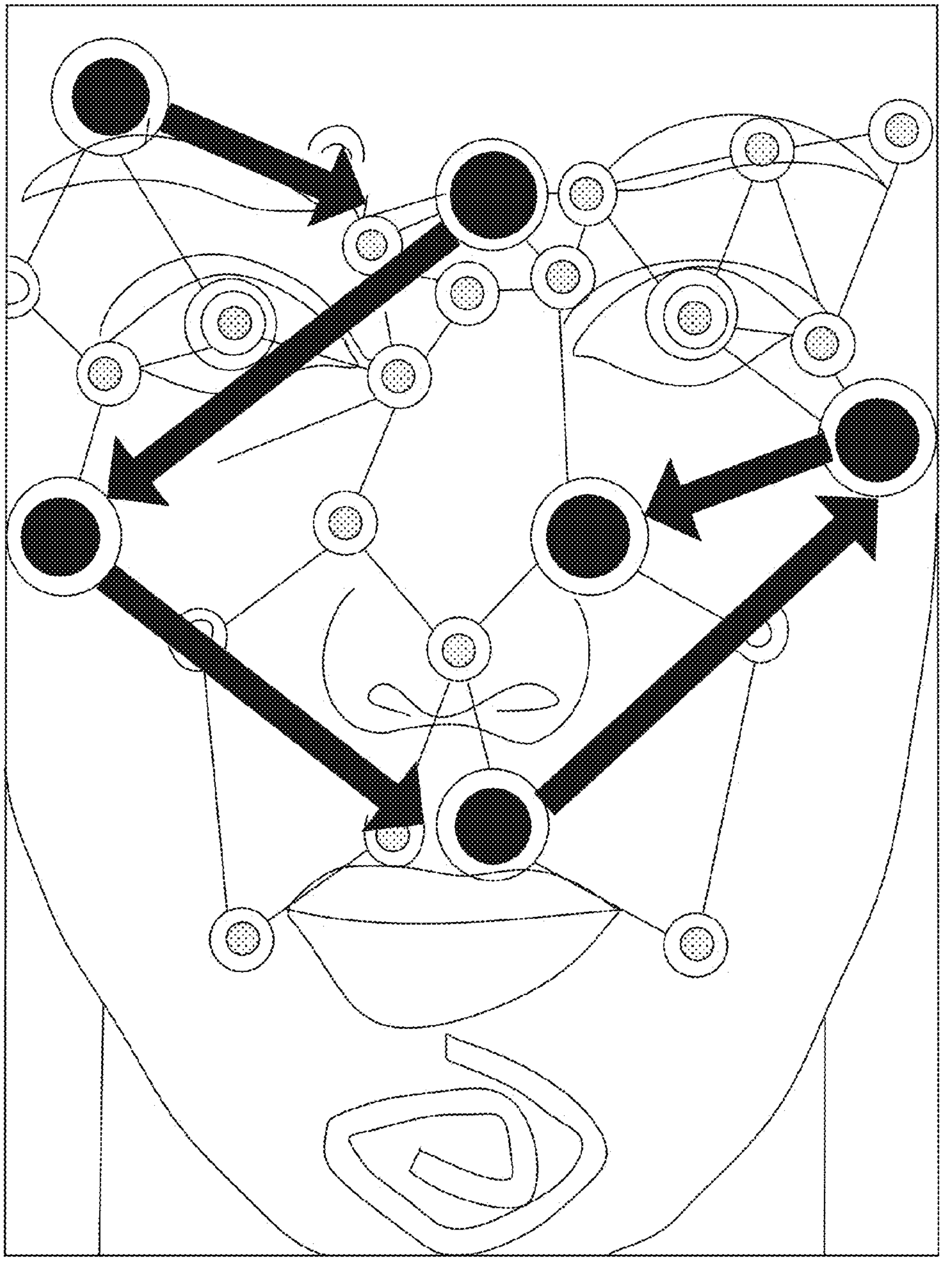
FIGS. 5A and 5B depict examples of tracing on facial images according to embodiments.
Figure 5B:
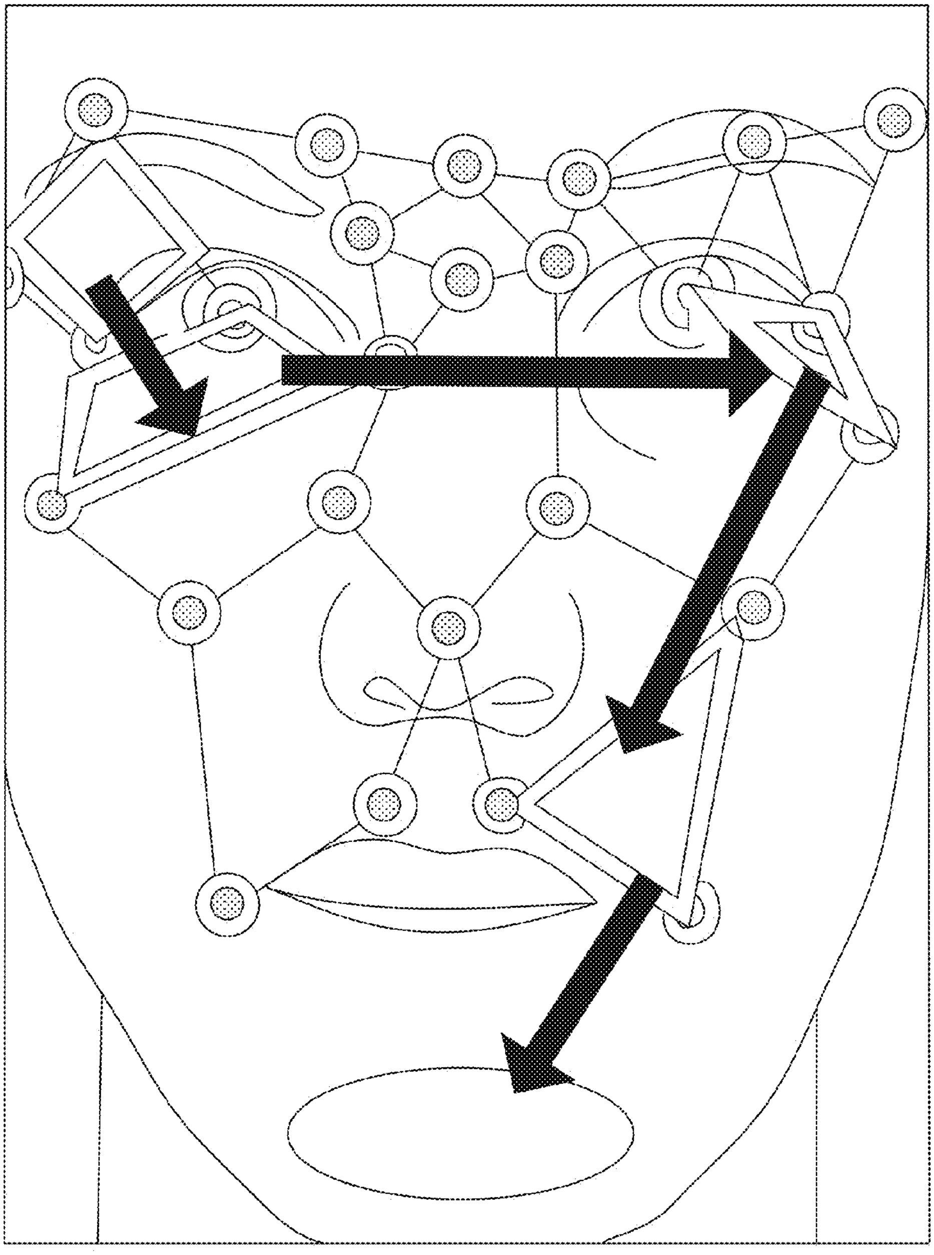

An example of tracing from marker to marker is provided in FIG. 5A, while an example of tracing from different areas is provided in FIG. 5B.

Figure 6:
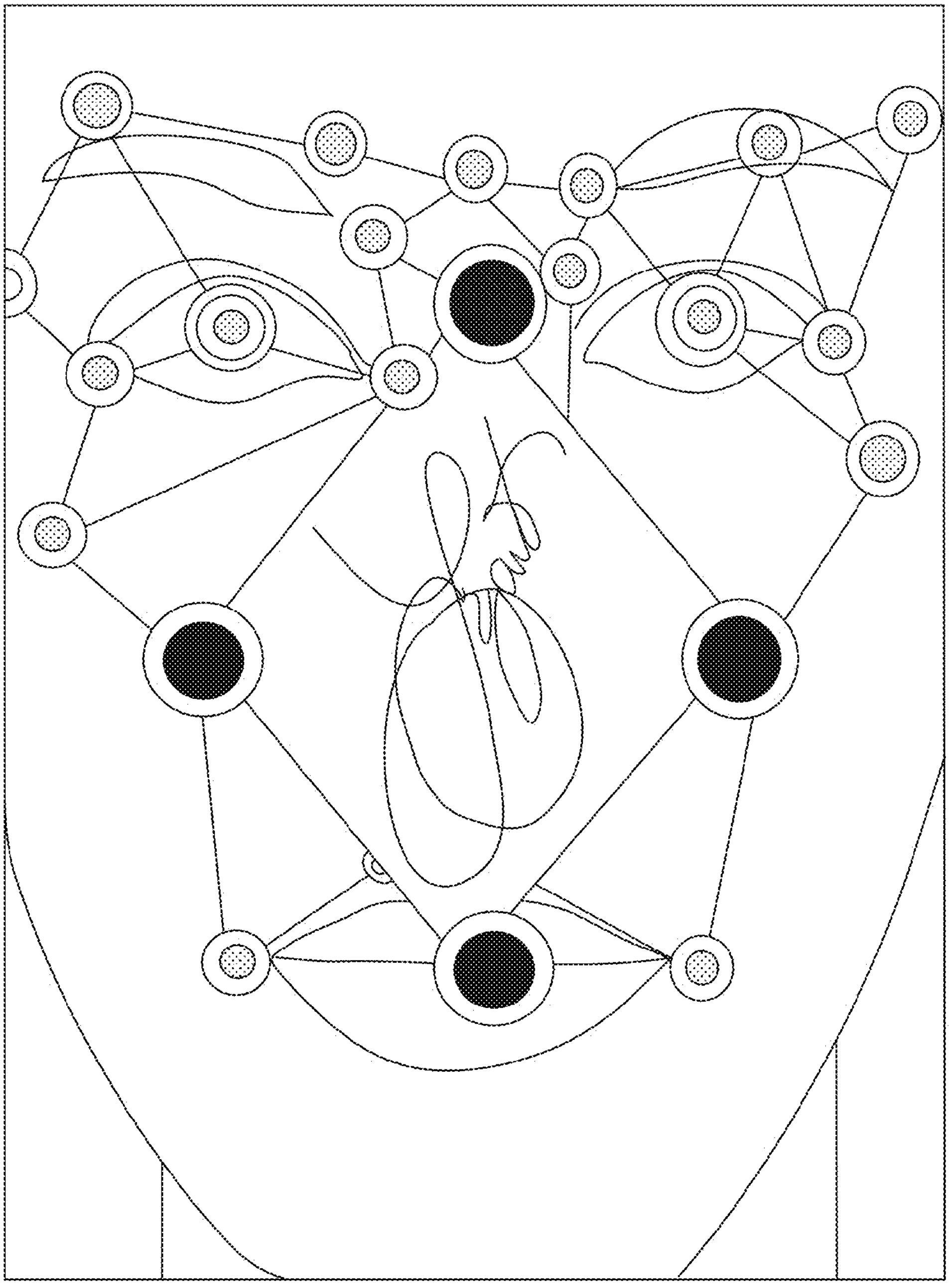
FIG. 6 depicts an example of the entry of a signature on a facial image according to one embodiment.

An example of a user entering a signature is provided in FIG. 6.

In step 380, the image and the touch-based data may be provided to the server, and, in step 390, the server may authenticate or deny the user.

Figure 7:
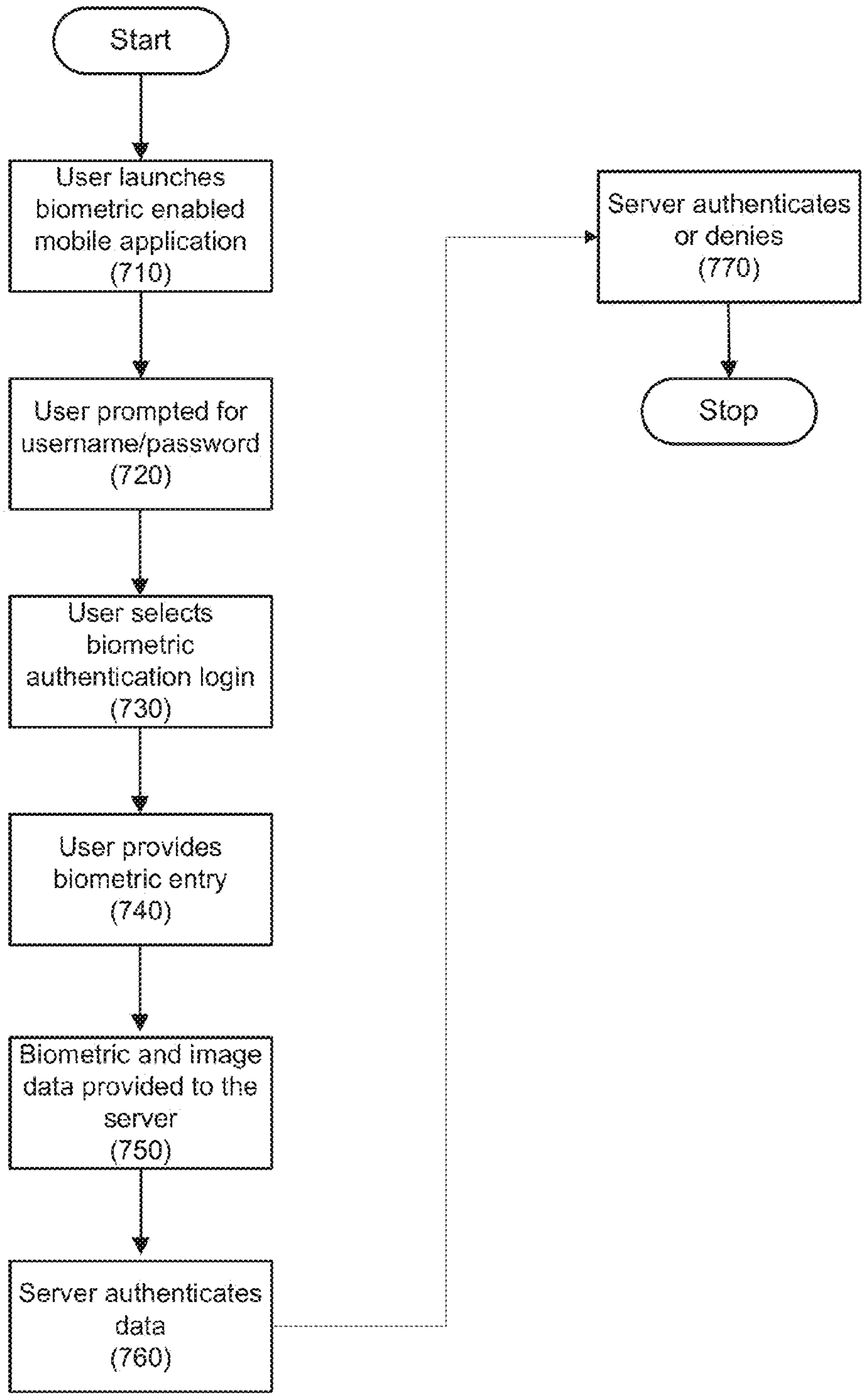
FIG. 7 depicts a method of authenticating a mobile application using biometrics according to one embodiment.

Referring to FIG. 7, a method of authenticating a mobile application using biometrics is provided.

In step 710, the user may launch a biometric-enabled mobile application on a mobile device.

In step 720, the mobile application may prompt the user for traditional login information (e.g., username and password) or for biometric authentication.

In step 730, if the user selects biometric authentication, the mobile device may prompt the user for biometric entry.

In step 740, the user provides at least one biometric entry. In one embodiment, at least one image, video, etc. of at least a portion of the user (e.g., the user's face) may be captured. In another embodiment, a voice biometric may be captured. In still another embodiment, a touch-based biometric may be captured.

Combinations of images and biometrics may be captured as is necessary and/or desired.

In step 750, the mobile device may submit the captured data to the server. For example, in one embodiment, the biometric and image data may be submitted to the server.

In step 760, the server may authenticate the data.

In step 770, if the server authenticates the data, the user is logged in to the mobile application. Otherwise, access is denied.

In another embodiment, biometric authentication may be used on individual transactions. For example, for transactions that are above a pre-specified threshold, biometric authentication may be required. The threshold may be based on a value of the transaction, a risk of a transaction, an anomaly detection algorithm, a likelihood of fraud, etc. In one embodiment, the authentication may be requested by providing a mobile device with a machine readable code (e.g., QR code), near field communication, Bluetooth, etc.

In one embodiment, the use of biometric authentication may reduce the number of false fraud claims, as the biometric authentication is tied to the user (e.g., image, speech, signature, combinations thereof, etc.) may be tied or linked to the user providing authentication.

Figure 8:
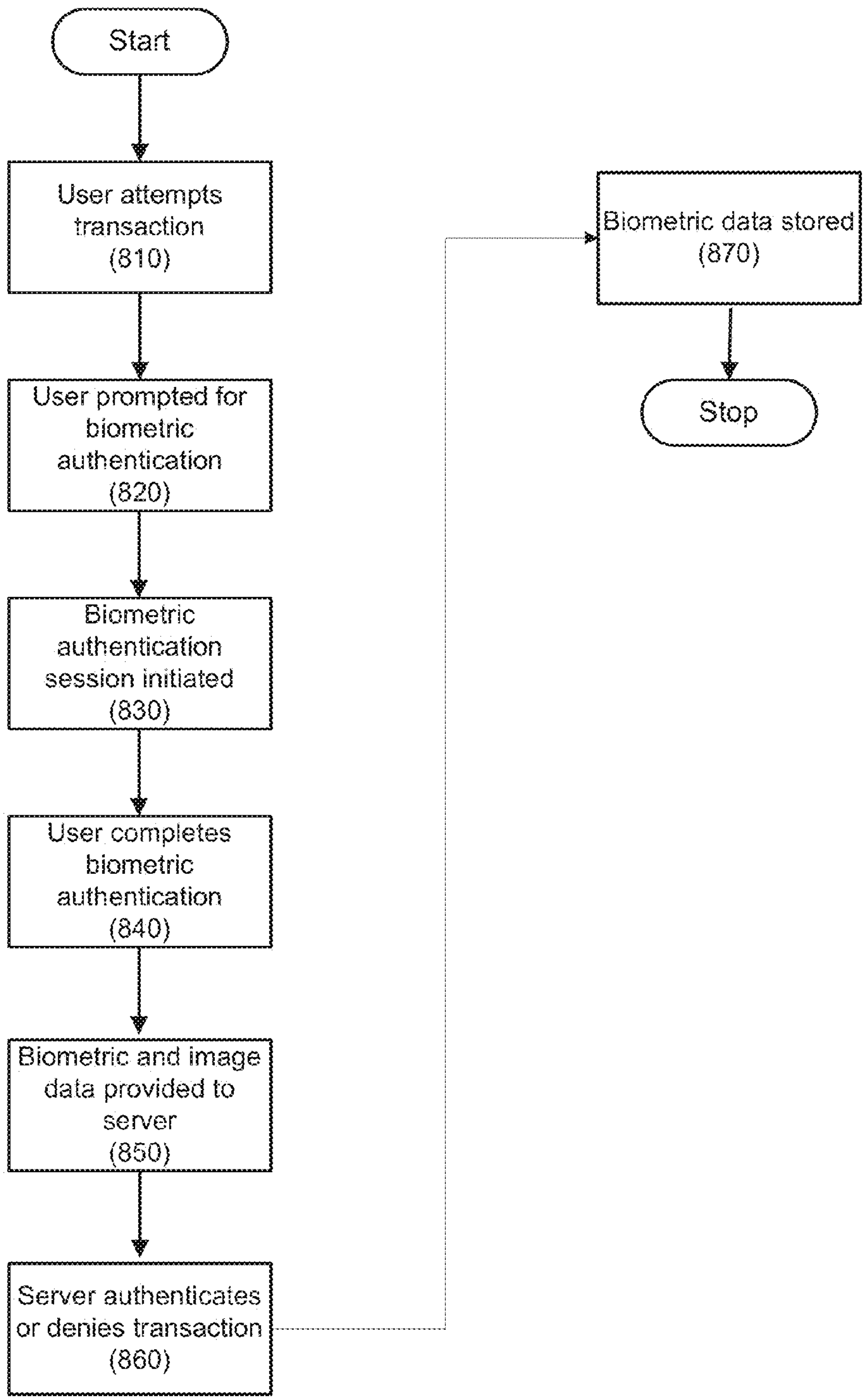
FIG. 8 depicts a method of authenticating a transaction using biometrics according to one embodiment.

Referring to FIG. 8, a method of authenticating a transaction is provided.

In step 810, a user may attempt a transaction that may exceed a predetermined threshold. The threshold may be based on a value of the transaction, a risk of a transaction, an anomaly detection algorithm, a likelihood of fraud, etc.

In step 820, the user is prompted for biometric authentication.

In step 830, a biometric authentication session is initiated on the mobile device.

In step 840, the user completes the biometric authentication. The level of biometric authentication may vary depending on the value of the transaction, amount of risk, etc.

In one embodiment, the biometric authentication session may be tied to the proposed transaction. For example, the user may be required to state "please execute transaction 556439." The user may further be required to provide a voice biometric or other biometric.

In step 850, the biometric and image data may be provided to the server.

In step 860, the server may authenticate or deny authentication, and therefore, the transaction.

In step 870, the biometric data is stored and associated with the transaction. For example, the captured image and signature, pattern, voice, etc. may be stored with the transaction file.

In one embodiment, the system may be retrained to address false rejections (e.g., rejections followed by successful password authentication). For example, after a certain number of false rejections (e.g., 2), the password authentication acquired biometrics may be incorporated with higher weight to retrain the biometrics system.

In one embodiment, the user can manually initiate a retraining session to address changes in behavior/appearance (e.g., glasses that will distort the eye biometrics, wearing contacts, surgery that alters the face biometrics markers, voice/health problems, etc.).

As discussed above, composite biometrics may be used. A composite biometric may be a combination of more than one biometric. In one embodiment, the composite biometric may include biometrics for more than one individual. For example, instead of storing and authenticating based on personal biometrics, composite images/profiles for groups of people (e.g. employees in the same group) with same level of access may be created. Thus, in one embodiment, only composite biometrics are stored, sent, and received, rather than individual profiles.

In one embodiment, composites may be based on approval chains for transactions, shared geographic location, department, role, etc.

For similarly located persons, the proximity or relative locations of mobile devices in the group may be used.

Once the biometrics data is captured through a mobile device, the authentication process may match user's captured data to the composites. In one embodiment, only differences from the composites are sent to the server. Thus, the mobile device may not need to store personalized biometrics, making it less susceptible to being compromised.

Figure 9:
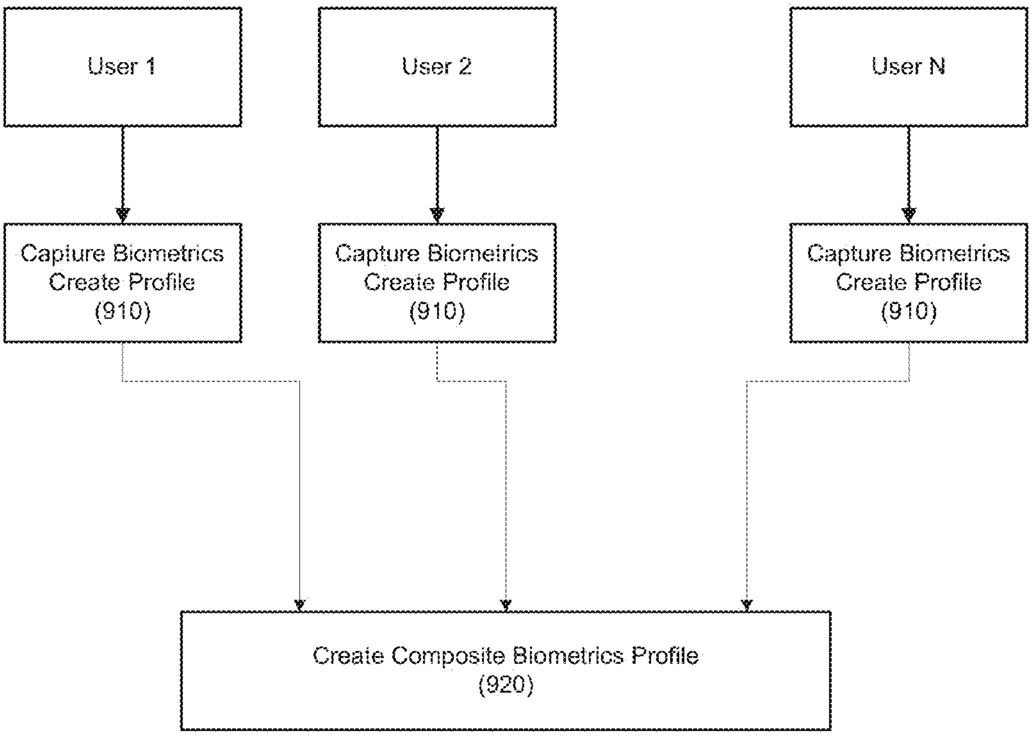
FIG. 9 depicts a composite biometric capture process according to one embodiment.

Referring to FIG. 9, a composite biometric capture process is provided. First, in step 910, the biometrics for User 1-User N are captured, and an individual profile is created. Next, in step 920, a composite biometrics profile for any group of User 1-User N is created.

Figure 10:
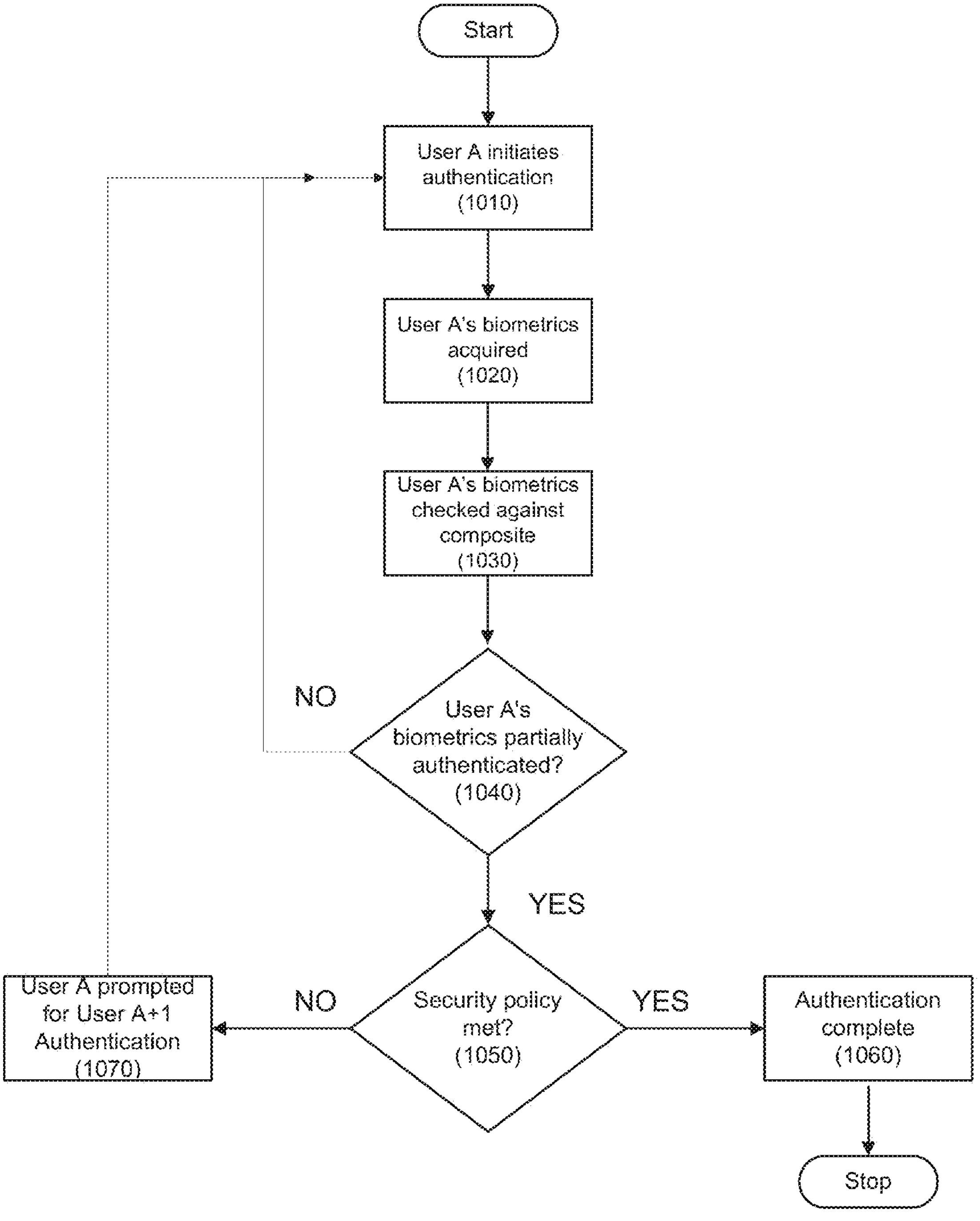
FIG. 10 depicts an authentication process for multi-user composite biometrics according to one embodiment.

Referring to FIG. 10, an authentication process for multiuser composite biometrics according to one embodiment is provided. In step 1010, User A initiates biometric authentication. In one embodiment, User A may be attempting to authenticate a transaction.

In step 1020, User A's biometrics may be acquired. In one embodiment, User A's biometric may be acquired using a mobile device as discussed herein.

In step 1030, User A's biometrics may be compared against a composite profile for a group. In one embodiment, individual biometrics may be checked against the composite biometrics vector through calculating delta function and match rates. User biometrics may be weighed based on, for example, the user's specific job role, transaction details, risk factors, environmental conditions and the quality of biometrics/confidence for the individual user.

In step 1040, if the User A's biometrics are not partially authenticated, the process may continue to recapture User A's biometrics.

If User A's biometrics are partially captured, the security policy may be checked. For example, a check may be made to ensure that User A has authority to authorize the transaction. In another embodiment, a check may be made to see if multiple users need to authorize the transaction. If the security policy is met, then in step 1060, authorization is complete.

If the security policy is not met, in step 1070, User A is prompted for User A+1 to provide biometric authentication. This may involve getting someone higher on the chain to authorize the transaction, another person of the same level, etc.

In one embodiment, "interactive biometrics" may be used. In one embodiment, an integrated biometrics process may not focus on capturing or matching based on individual modalities of biometrics such as purely face recognition or voice recognition. Instead, it creates an integrated profile where key markers may be tied to each other to create integrated markers in a multi-dimensional spatio-temporal vector space.

Figure 11:
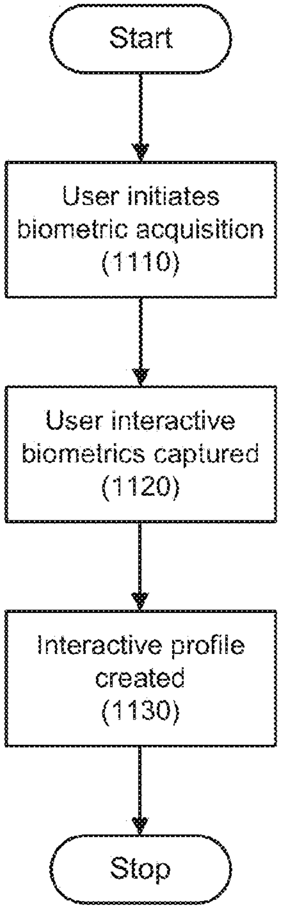
FIG. 11 depicts an interactive biometric capture process according to one embodiment.

Referring to FIG. 11, an interactive biometric capture process is disclosed. In step 1110, the user may initiate biometric acquisition.

In step 1120, the user's interactive biometrics may be captured. In one embodiment, the interactive process may be a fused capture where a free form interactive activity is translated to multiple fused biometrics profiles on the server end. A fused process may integrate and/or link multiple modalities and individual features for a user.

In one embodiment, biometrics markers may be spatio-temporally linked with respect to other markers and environmental parameters. Examples include (1) the user's facial biometrics markers while saying a selection of specific keywords; (2) the user's facial biometrics markers for facial expressions/gestures in response to the interactive process; (3) behavioral profile during face recognition (e.g., blinks), behavioral gestures during interactive process; (4) the distance between users face to mobile device to read a set of words from the screen; (5) the user's impulse response characteristics linked to, for example, pupil sizing, face biometrics, etc. when presented familiar images or images that create behavioral response such as facial gestures; and (6) an image profile that may be linked to an infrared profile during interactive speech.

In one embodiment, the integrated biometrics process may identify key marker links among image/voice/behavioral, etc. data to create new features for authentication. For example, markers <1-N> in image, <x-y> in voice, <p-q> in behavioral profile may create a specific spatio-temporal pattern/feature during the interactive process that uniquely identifies the user across multiple biometrics planes.

In one embodiment, the process may execute with the user's attention. In another embodiment, the process may run in the background while the user performs other tasks.

The interactive process may capture biometrics, including for example, face biometrics, iris biometrics, voice biometrics, behavioral biometrics (through video recording), keyboard/touch screen usage, other forms of biometrics/behavioral profiles, etc.

In step 1130, a profile for the user is created. The resulting integrated profile may have partial biometrics for individual modalities, such a N features out of total M features for face recognition. Individual features in face recognition, however, may be linked to other modalities, such as voice/video based behavioral profiling, to environmental factors, etc.

Figure 12:
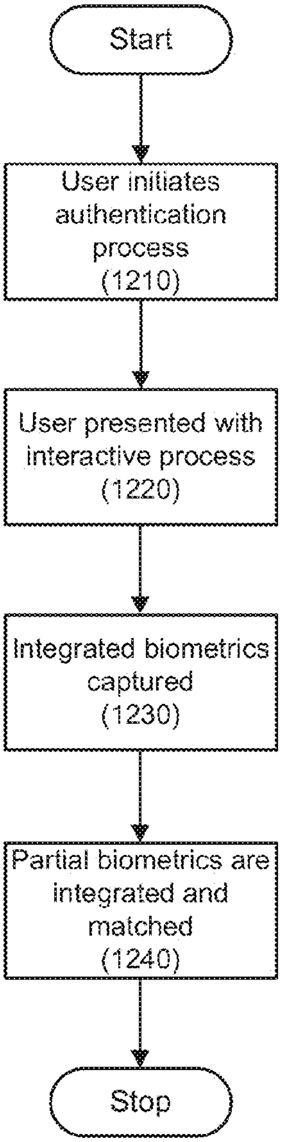
FIG. 12 depicts an authentication process involving integrated biometrics according to one embodiment.

In FIG. 12, an authentication process involving integrated biometrics according to one embodiment is provided.

In step 1210, the user may initiate an integrated biometrics authentication process. This may be done, for example, using a mobile application executed on a mobile device.

In step 1220, the user is presented with an interactive process.

In step 1230, multiple biometrics and/or data are captured in an integrated process. In one embodiment, this process may capture a plurality of face biometrics, iris biometrics, voice biometrics, behavioral biometrics, keyboard/touch screen usage, and other biometrics/data as necessary and/or desired.

In one embodiment, as part of the acquisition, biometric features and data may be linked and analyzed with respect to each other and/or environmental factors, etc.

In step 1240, partial biometric features may be integrated and matched using, for example, corresponding matching scores. In one embodiment, the user may not be verified or authenticated in any individual modality, but rather though an integrated linked modality. This may provide higher levels of security against spoofing, imposters, etc.

In one embodiment, additional security features may be used. For example, multiple biometrics may be captured and/or recognized simultaneously. In one embodiment, a user's iris and face (and other modalities) may be recognized simultaneously. This may be accomplished using a mobile device's camera, for example. In another embodiment, Google Glass, or a similar device, may be used for iris recognition using a high-resolution image of one eye.

In another embodiment, simultaneous face recognition and finger printing may be used. For example, thin film technology may be used to allow finger print authentication using the mobile device touch screen. This enables simultaneous face recognition and finger printing, where the fingerprint and face biometrics are captured by user simply holding the mobile device.

In one embodiment, customizable fused partial modes may be based on a user's geographical location and available biometrics data. For example, partial face recognition (using eye area) with voice recognition may be used. This may be useful in areas where the use of full biometrics is not permitted.

In one embodiment, the use of full, partial, composite, etc. biometrics may be based on user preferences. In one embodiment, the user preferences may be set by the user, based on the user's calendar, based on the GPS location of the mobile device, etc.

In one embodiment, machine learning based techniques may be used to determine the modalities, thresholds, algorithms, etc. that are best fitted to be used in that specific session based on a multi-dimensional vector including user preferences, security settings, environmental factors, transaction characteristics, etc.

Figure 13:
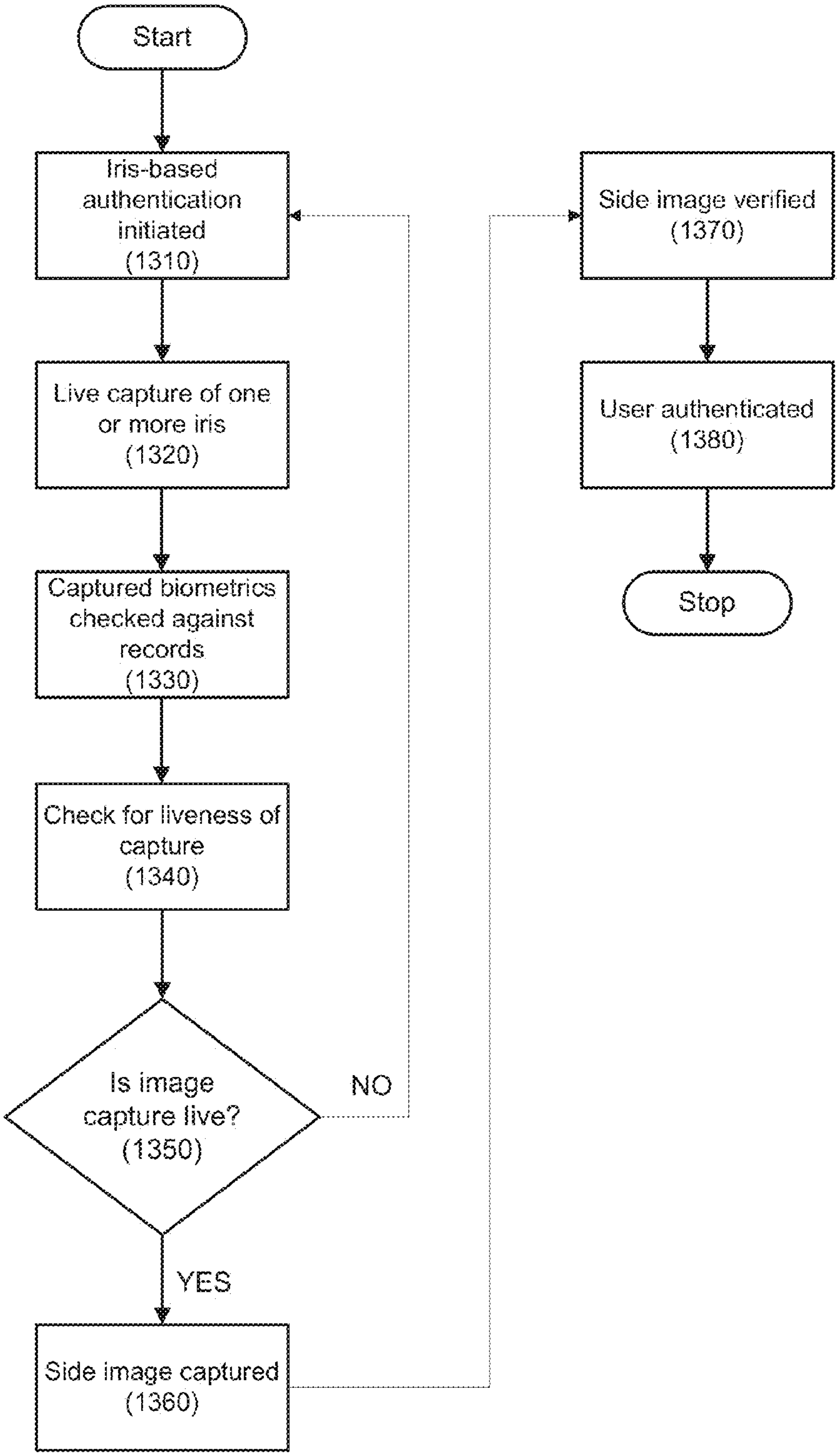
FIG. 13 depicts an exemplary iris capture method according to one embodiment.

Referring to FIG. 13, a flowchart depicting an iris recognition technique according to one embodiment is disclosed. In one embodiment, iris recognition may be a part of any of the authentication processes disclosed herein. In another embodiment, iris authentication may be a stand-alone process.

In step 1310, an iris-based authentication process is initiated. In one embodiment, iris authentication may be a stand-alone authentication procedure. In another embodiment, iris authentication may be part of a larger authentication process.

In step 1320, an image, video, etc. of one or both of the user's irises may be captured. In one embodiment, the iris capture may be performed by the user's mobile electronic device. In another embodiment, the iris capture may be performed by a camera provided for a desktop or notebook computer. In still another embodiment, the iris capture may be performed using any suitable camera, such as a security camera.

In one embodiment, the image or video may be captured sequentially (i.e., one after the other). In another embodiment, the image or video capture may be performed in parallel (i.e., both irises at the same time).

In step 1330, the captured image may be compared to iris information in a database. In one embodiment, this comparison may be performed by the mobile device sending some, or all, of the image data to a server. In another embodiment, this comparison may be made at the mobile device.

In one embodiment, anomaly detection may be performed on the captured image/video. In one embodiment, this may involve checking the size of the irises with eye-region biometrics from the user's profile, prior authentications, etc. Other anomaly detections may be performed as necessary and/or desired.

In step 1340, the mobile device and/or server may determine if the captured image, video, etc. is a live image, video, etc. In one embodiment, this may be performed by instructing the user, via the user's mobile device or suitable interface, to look up, look down, cross eyes, etc. In one embodiment, the user may have a limited time (e.g., 2 seconds) to respond as directed.

In another embodiment, different lighting may be used to check for a live image. For example, multiple images and/or video may be used to detect the change in pupil size in response to different lighting. In general, the size of the change in pupil size is proportional to the level of lighting change. Thus, in one embodiment, the lighting level and the pupil size may be determined for different lighting levels.

In one embodiment, the user's mobile device may use its flash, change the brightness of its screen, etc. to cause a change in lighting level.

In one embodiment, a check may be made to see if the image of the compressed or decompressed iris is consistent with the user profile, a stored image, etc. For example, the compressed or decompressed iris image may be a systematically distorted version of the original image, where different features are distorted with different scaling factors based on their location. The distortion may be calculated based on an elastic band model, can be matched against a profile, etc. For matching, the user can be profiled with different lighting conditions such that the system acquires a number of dilation factors (e.g. 25%, 50%, 75%, 100%).

In one embodiment, the images/video may be checked to determine if the user is wearing colored contact lenses. In one embodiment, a check may be made for a detectable pattern in the inner circle of the iris. In another embodiment, a check may be made for pattern changes with different lighting. In another embodiment, a check may be made for outer periphery effects of color contacts, whether there are detectable ring shadows around the iris, etc. In still another embodiment, a blinking test may be performed to determine if the iris is moving relative to the rest of the patterns during/after blinking. Other checks, combinations of checks, etc. may be used as necessary and/or desired.

In one embodiment, an IR image/video may be used check the image/video of the irises. In one embodiment, the IR image/video may be checked against historical data.

In step 1350, if the capture is live, in step 1360, a side image, video, etc. of the iris may be captured.

If the image is not a live image, the process may start over. In another embodiment, the account may be locked. This may occur after, for example, one failed attempt, a certain number of failed attempts.

In step 1370, the side image may be verified. In one embodiment, the system may check for the clarity, transparency, etc. of the side view of cornea. In one embodiment, biometrics data for the cornea may be verified. In still another embodiment, if color contact lenses are detected, a check is made to determine if the color contacts block the light in the side view.

In step 1380, if the side image is verified, the user may be authenticated. In another embodiment, the user may proceed to additional authentication (biometrics and otherwise) as necessary and/or desired.

The disclosures of the following are hereby incorporated, by reference, in their entireties: U.S. patent application Ser. Nos. 13/492,126; 13/297,475; 11/337,563, 12/534,167; 10/867,103; 12/715,520; 10/710,315; 10/710,328; 11/294,785; and U.S. Pat. Nos. 8,028,896 and 7,117,365.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for multi-mode authentication of a user to a second electronic device using a first electronic device comprising:

a computer application executed by a first electronic device that is associated with a user receiving a machine-readable code captured by a first input device on the first electronic device, wherein the machine-readable code is presented by a second electronic device and comprises an electronic device identifier for the second electronic device;

the computer application receiving a first biometric from a second input device on the first electronic device;

the computer application receiving a second biometric from a third input device on the first electronic device; and the computer application repeating the receipt of at least one of the first biometric and the second biometric, in response to the first biometric and the second biometric not being received within a predetermined time period;

the computer application communicating the electronic device identifier, the first biometric and the second biometric to a server independent of the second electronic device for authentication;

wherein the server authenticates the user based on the association of the first electronic device with the user, the first biometric, and the second biometric, and communicates the authentication to the second electronic device associated with the electronic device identifier; and wherein the second electronic device grants access to the user in response to the authentication.

2. The method of claim 1, wherein the first input device is a first camera.

3. The method of claim 1, wherein the second input device is a second camera, and the first biometric is an image of at least a part of the user.

4. The method of claim 3, wherein the image comprises at least one of the user's eyes.

5. The method of claim 3, wherein the image comprises at least a portion of the user's face.

6. The method of claim 1, wherein the third input device is a microphone, and the second biometric comprises a voice biometric.

7. The method of claim 1, wherein the third input device is touch-sensitive, and the second biometric comprises a finger biometric.

8. The method of claim 1, wherein the second biometric comprises a behavioral biometric.

9. The method of claim 1, wherein the second biometric comprises a thermal biometric.

10. The method of claim 1, wherein the authentication permits the user to access a website on the second electronic device.

11. The method of claim 1, wherein the authentication permits the user to conduct a transaction using the second electronic device.

12. The method of claim 11, wherein the transaction has a value above a predetermined value.

13. The method of claim 11, wherein the transaction has a risk level above a predetermined risk level.

14. The method of claim 1, wherein the first input device and the second input device are the same device.

15. The method of claim 1, wherein the authentication permits the user to access a software application on the second electronic device.

16. The method of claim 1, wherein the authentication permits the user to access an account using the second electronic device.

17. A method for multi-mode authentication of a user to a second electronic device using a first electronic device comprising:

a server comprising at least one computer processor receiving, from a first electronic device that is associated with a user, a machine-readable code captured by a first input device on the first electronic device, wherein the machine-readable code is presented by a second electronic device and comprises an electronic device identifier for the second electronic device;

the server receiving, from the first electronic device and independent of the second electronic device, a first biometric received using a second input device on the first electronic device;

the server receiving, from the first electronic device and independent of the second electronic device, a second biometric received using a second input device on the first electronic device;

the server authenticating the user based on the association of the first electronic device with the user, the first biometric, and the second biometric; and the server communicating the authentication to the second electronic device associated with the electronic device identifier;

wherein the computer application repeats the receipt of at least one of the first biometric and the second biometric in response to the first biometric and the second biometric not being received within a predetermined time period;

wherein the second electronic device grants access to the user in response to the authentication.

18. The method of claim 17, wherein the first biometric comprises an image of at least a part of the user image.

19. The method of claim 17, wherein the second biometric comprises a user biometric.

20. The method of claim 17, wherein the authentication permits the user to access a website on the second electronic device.

21. The method of claim 17, wherein the authentication permits the user to conduct a transaction using the second electronic device.

22. The method of claim 21, wherein the transaction has a value above a predetermined value.

23. The method of claim 21, wherein the transaction has a risk level above a predetermined risk level.

24. The method of claim 17, wherein the authentication permits the user to execute a second computer application on the second electronic device.

25. The method of claim 17, wherein the authentication permits the user to access a software application on the second electronic device.

26. The method of claim 17, wherein the authentication permits the user to access an account using the second electronic device.

27. The method of claim 17, further comprising:

the server communicating an indication to at least one of the second electronic device and the first electronic device that the authentication was unsuccessful.

28. A system for multi-mode authentication comprising:

a first electronic device that is associated with a user comprising a first input device, a second input device, and a third input device;

a second electronic device associated with an electronic device identifier and executing an application requiring authentication for the user to access; and a server comprising at least one computer processor that is in communication with both the first electronic device and the second electronic device;

wherein:

the first electronic device receives a machine-readable code captured by the first input device, wherein the machine-readable code is presented by a second electronic device and comprises the electronic device identifier for the second electronic device;

the first electronic device receives a first biometric from the second input device;

the first electronic device receives a second biometric from the third input device;

the computer application repeating the receipt of at least one of the first biometric and the second biometric, in response to the first biometric and the second biometric not being received within a predetermined time period;

the first electronic device communicates, independently of the second electronic device, the machine-readable code, the first biometric, and the second biometric to the server;

the server authenticating the user based on the association of the first electronic device with the user, the first biometric, and the second biometric the server communicating the authentication to the second electronic device associated with the electronic device identifier; and wherein the second electronic device grants access to the user in response to the authentication.

29. The system of claim 28, wherein the first biometric comprises an image of at least a part of the user.

30. The system of claim 28, wherein the second biometric comprises a user biometric.

31. The system of claim 28, wherein the application requiring authentication comprises a computer application.

32. The system of claim 28, wherein the application requiring authentication is a transaction application.

33. The system of claim 28, wherein the application requiring authentication is a logon application.

34. The system of claim 30, wherein the image comprises at least one of the user's eyes.

35. The system of claim 22, wherein the image comprises at least a portion of the user's face.

* * * * *